Feb. 11, 1930. J. F. KETCHEY 1,746,481
MIXING BLADE
Original Filed Sept. 11, 1925 2 Sheets-Sheet 1

John F. Ketchey
INVENTOR

Feb. 11, 1930.                J. F. KETCHEY                1,746,481
                              MIXING BLADE
              Original Filed Sept. 11, 1925    2 Sheets-Sheet 2
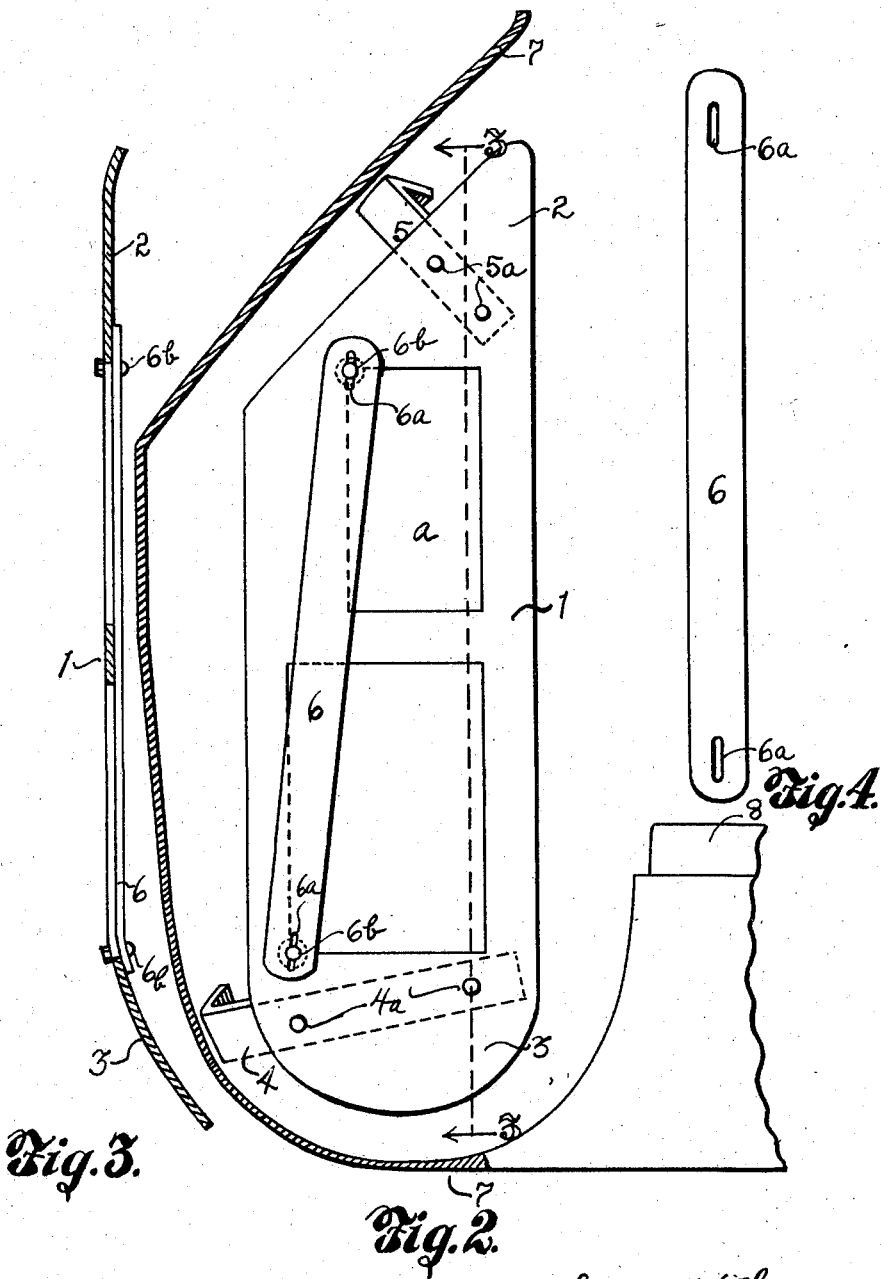

Patented Feb. 11, 1930

1,746,481

UNITED STATES PATENT OFFICE

JOHN F. KETCHEY, OF DALLAS, TEXAS

MIXING BLADE

Application filed September 11, 1925, Serial No. 55,864. Renewed December 8, 1928.

This invention relates to machines for mixing plastic materials and refers more particularly to an adjustable blade adapted to increase the efficiency of said machinery.

An object of the invention is to provide a blade which is adjustable as pertains to surface area or pick-up and the openings therein.

A further object is the provision of a blade so graduated from toe to heel, both with reference to the surface area or pick-up and the openings through which the aggregate may fall that the materials nearer the mouth of the mixer may be agitated or stirred as rapidly as the remaining portion of the batch.

A further object is the provision of an adjustable blade in order that coarse and fine aggregates may both be mixed in the same rapid and thorough manner which is only possible by adjustment to meet the varying conditions.

A further object is the provision of a blade graduated with greater surface area or pick-up on the side of the blade adjacent the bowl which substantially increases its efficiency. Another advantage of this invention is that the blade is so shaped and positioned that in the revolving of the mixing bowl in which it is used the material is lifted from the bottom toward the top of the bowl in a diagonal rolling movement over the blades and also rolled over in a horizontal plane.

An advantage of this invention is that it may be employed without dependence for mixing effect on any other auxiliary attachments or irregular shape of the bowl, when secured thereto in a diagonal position with reference to the axis of rotation and with toe or bottom portion substantially advanced with reference to the heel or upper portion.

A further advantage is the heel or paddle portion which hastens dumping or unloading the materials from the drum when the bowl is in a position to discharge.

These objects and advantages, as well as others brought out in the course of these specifications, may be more clearly understood in the following description taken in connection with the attached drawings in which Figure 1 represents a cross sectional view of a mixing bowl, showing the disposition of blades therein.

Figure 2 is a detailed view of the top surface of one of the blades.

Figure 3 is a cross sectional view of one of the blades.

Figure 4 is top view of the adjustment bar.

Figure 1:
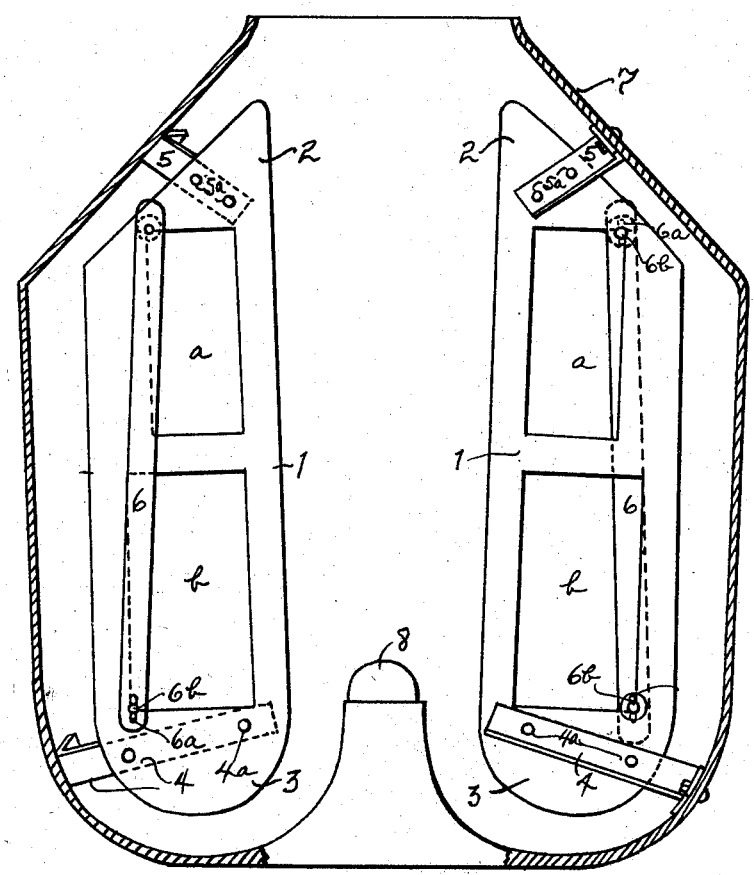
Figure 5:
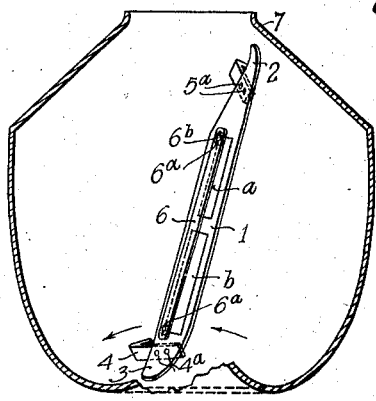
Figure 5 is an edge view of a mixing blade attached in the mixer drum.

Continuing the description, the body of the blade 1, shaped from a flat piece of suitable weight metal is bent or curved at 2, described more fully hereinafter. An aperture $a$ in the upper portion of the blade is made. This aperture is smaller in width than the aperture $b$ formed below it for reasons set out more fully hereinafter. The blade is provided with a strip or bar 6, shown in detail in Figure 4, which has a slot $6^a$ at a point adjacent each end thereof. This bar is adapted to be attached to the end extremities of either of the apertured frames formed by the blade, and is moved over or to one side of the apertures depending upon the particular mix or ingredients to be mixed. Straps 4 and 5 secure the blade at the top 2 and bottom 3 to the inner walls of the mixing bowl 7. The toe of the blade or that portion designated by the numeral 3 is bent forward and is shaped to conform to the shape of the bottom of the bowl.

The heel 2 is sloped slightly forward at the extremity thereof for reasons covered fully in the description of operation hereinafter. The drum revolves on shaft 8.

In operation, when it is desired to mix a coarser or heavy aggregate the bar is set to the side of the apertures to permit substantially large quantities of the aggregate to pass through the blades. As increasingly finer aggregate is used, the bar is moved to cover more of the openings to an extent whereby the same rapid mix may be attained when the bowl is revolved, as has been previously attained with the coarse aggregate.

The aperture $a$ in the blade is smaller than the aperture $b$ because the top part of the blade is moving through a smaller circle or on a smaller radius than the lower portion, and in order to even up or equalize the amount of agitation of the aggregate, the greater blade surface at the top portion of the blade is necessary. Furthermore, the inner edge of the blade, or that nearest the wall of the drum, must be substantially wider than the outer edge or that extending toward the center of the drum, because the aggregate gravitates to the lower, outer portion of the drum, therefore the greater surface area or pickup along this line is conducive to more rapid mixing.

The blades, because of their angular attachment to the walls of the drum, besides the plowing and pick-up motion mentioned, also tend to roll the aggregate over and over in a vertical or nearly vertical plane, the entire movement being such as to lift the material and agitate same violently.

The bars 6 may be moved to any desired angle over or with respect to the apertures when it is desired to mix a finer aggregate. In short, the pick-up or material agitating or lifting surface capacity of the blades is at a maximum without blocking or retarding speed, and is therefore conducive to more rapid mixing. Also, because of the slope of the blade and its distance from the wall of the drum, substantially large quantities of the material feed through under the blade, without clogging against the drum wall, leaving said wall clean at all times.

The blades are secured at an angle with respect to the axis of rotation of the bowl with the lower or toe portions advanced with respect to the upper portion. The upper portion or heel of each blade is bent at its extremity slightly to assist in discharging the aggregate after the mix is complete.

The slope or angle at which the broad toe of the blade is set assists in the mixing of the material as it effects a plowing motion of the material and rolls it over and over in a vertical plane.

The revolution of the bowl and the arrangement of the blades gives a duplex motion to the material which accelerates the mixing process.

By the movement of the adjustment bar, the pick-up and fall through of each blade is adjusted properly for the particular mix desired.

When the material is thoroughly mixed, and the bowl is tipped for dumping, the angle at which the blades are set and slight angle at the heel of each, accelerates the dumping process.

The blades are preferably set in or secured to the interior walls of the bowl with their plane surfaces at an obtuse angle at the point of attachment, so that they lean away from the load and slapping against the aggregate, break it up and mix it with the least amount of resistance, thereby allowing greater speed of the drum.

What I claim is:—

1. In combination with tilting drum type concrete mixers, having a common charging and discharging opening, agitating means comprising a blade adapted to be secured in obtuse angular attachment to the interior wall of the mixer drum, in such a manner as to lean away from the load, said blade having a plurality of openings therein, graduated in size from the top to the bottom of the blade, and means on said blade to adjustably reduce the area of the openings and increase the blade surface on the side thereof adjacent the drum wall.

2. In combination with that type of concrete mixer drum having a common charging and discharging opening, a plurality of skeleton blades adjustably secured to the inner wall of the mixer drum, each being formed with the body thereof in slightly opposed curvature and secured in the drum at an angle with respect to the axial line of the drum, said blades being provided with openings graduated in size from the top to the bottom, and means in adjustable attachment to each blade to increase the surface area of the blade on that side thereof adjacent the drum wall and to decrease said openings in the blade proportionately one to the other.

3. In concrete mixing machinery, a mixing drum provided with a blade of the character described, having openings graduated in size from the top to the bottom of the blade, and having a greater surface area on that side adjacent the wall of the mixer drum, and means in adjustable attachment to the blade to increase the area of the blade side adjacent the drum, and to relatively decrease the size of the graduated openings in the blade.

4. A mixing means in combination, a tilting drum concrete mixer, a plurality of blades in angular attachment to the interior side walls of the mixer drum, each of said blades having openings therein, graduated in size from the top to the bottom of the blade, each blade having a forwardly projecting toe conforming in shape to the bottom of the mixer drum, and having a greater surface area on that side adjacent the mixer drum wall.

5. In a blade of the character described, a broad curved, forwardly extending portion at the lower extremity thereof, a rearward, obliquely extending body portion, and a heel portion extending obliquely and rearwardly from the body portion, said blade being provided with graduated openings therein from the top to the bottom thereof, and means to adjust the size of the openings.

In testimony whereof I have signed my name to this specification.

JOHN F. KETCHEY.